United States Patent [19]

Pfleger et al.

[11] 4,087,601
[45] May 2, 1978

[54] MANUFACTURE OF ETHYLENE/N-BUTYL ACRYLATE COPOLYMERS

[75] Inventors: Klaus Pfleger; Wieland Zacher; Klaus Boettcher, all of Wesseling; Ronald Skorczyk, Cologne; Oskar Buechner, Dudenhofen; Franz Georg Mietzner, Ludwigshafen, all of Germany

[73] Assignee: BASF Aktiengesellschaft, Ludwigshafen, Germany

[21] Appl. No.: 786,406

[22] Filed: Apr. 11, 1977

[30] Foreign Application Priority Data

Apr. 21, 1976 Germany ............................ 2617413

[51] Int. Cl.² ............................................ C08F 210/02
[52] U.S. Cl. ........................................ 526/329; 526/64
[58] Field of Search ............................ 526/64, 65, 329

[56] References Cited

U.S. PATENT DOCUMENTS

| | | | |
|---|---|---|---|
| 2,953,551 | 9/1960 | White | 526/64 |
| 3,090,778 | 5/1963 | Ehrlich et al. | 526/64 |
| 3,350,372 | 10/1967 | Anspon et al. | 526/329 |

*Primary Examiner*—Harry Wong, Jr.
*Attorney, Agent, or Firm*—Keil, Thompson & Shurtleff

[57] ABSTRACT

A process for the manufacture of copolymers of ethylene with n-butyl acrylate in a polymerization zone at pressures above 800 atmospheres and at from 150° to 350° C, wherein the reaction mixture obtained is transferred, via a cooling zone which is at a pressure below 500 atmospheres and at from 150° to 250° C, into the high pressure product isolation zone, the mean residence time of the reaction mixture in the two zones being from 2 to 10 minutes. A copolymer which gives good films is obtained.

5 Claims, No Drawings

MANUFACTURE OF ETHYLENE/N-BUTYL ACRYLATE COPOLYMERS

The present invention relates to a process for the manufacture of ethylene copolymers which contain up to 30 percent by weight of n-butyl acrylate as copolymerized units.

In this process, ethylene and n-butyl acrylate are copolymerized in a polymerization zone (A) at pressures above 800 atmospheres and at from 150° to 350° C, with mean residence times which are sufficient to cause polymerization, but which are at most 100 seconds and temperatures of from 260° to 300° C at the outlet and following the polymerization, the reaction mixture obtained is passed via a cooling zone (B) into the high pressure product isolation zone (C), into the low pressure product isolation zone (D) and into a discharge extruder (E).

The copolymers of ethylene and n-butyl acrylate manufactured by conventional process are of unsatisfactory quality.

Using the conventional processes, high temperatures in the zones (or units) downstream from the polymerization zone (or reactor) tend to lead to crosslinking of the product and hence to the formation of inhomogeneous non-film-forming polymers. Further, it has been found that, above all if the reactor is run for lengthy periods, the formation of crosslinked, inhomogeneous products in units downstream from the reactor cannot be avoided, and this has an adverse effect in respect of film-forming properties.

It is an object of the present invention to provide a process whereby, in the main, film-forming products, i.e., products of good homogeneity, are obtained even after prolonged running of the reactor.

According to the invention, this object is achieved by a process wherein the cooling zone (B) and the high pressure product isolation zone (C) are at the same pressure, i.e., at from 250 to 500 atmospheres, and at the same constant temperature of from 150° to 250° C, preferably from 200° to 235° C, and the mean residence time of the reaction mixture in the two zones B and C is from 2 to 10 minutes.

In an advantageous embodiment of the process, the temperature of the reaction mixture in the high pressure product isolation zone (C) is kept constant to ± 2° C.

In a further advantageous embodiment of the process, the low pressure product isolation zone (D) and the discharge extruder (E) are directly connected, without an intervening shut-off device, and the level of the reaction mixture in D is set by the output of E. In a particularly advantageous embodiment, the level of the reaction mixture in the low pressure product isolation zone (D) fluctuates by at most ± 3%.

Homogeneous ethylene copolymers which contain up to 30 percent by weight of n-butyl acrylate as copolymerized units are obtained. Because of their good homogeneity, the ethylene copolymers manufactured by the process according to the invention can be employed in the film sector.

The copolymerization of ethylene with n-butyl acrylate is carried out in a tubular polymerization apparatus, as is conventionally used for continuous high pressure polymerization. Carrying out the high pressure polymerization process continuously has proved particularly advantageous. For details of polymerization in tubular reactors, reference may be made to Ullmann's Enzyklopädie der Techn. Chemie, 3rd edition, published by Urban & Schwarzenberg, Munich-Berlin, 1963, volume 14, pages 138–148. The ratio of the diameter of the reaction tube to its length is suitably from 1:20,000 to 20:20,000. As a rule, the reaction tube is surrounded by a jacket which receives the heat transfer medium. The jacket is divided into two zones which can be heated independently of one another, the first zone extending over two-fifths of the length of the tube and the second zone over the remaining three-fifths. At the end of the reaction tube, i.e., at the end of the reaction zone (A), there is a valve which serves to regulate the pressure in the polymerization chamber and also to discharge the reaction product into the cooling zone (B) and the high pressure product isolation zone (C) downstream from the said cooling zone. The pressure in the reaction tube in which the polymerization of the monomer mixture is carried out is in excess of 800 atmospheres. As a rule, the copolymerization is carried out at pressures of up to 3,000 atmospheres, though it can be carried out at pressures of up to 8,000 atmospheres. The temperature in the reaction zone is from 150° to 350° C, preferably from 260° to 300° C. The mean residence time, in the reaction zone, of the mixture to be copolymerized is very short, being sufficient to cause polymerization, but at most 100 seconds. This mean residence time is defined by the ratio of the volume of the apparatus to the mean volume of product which passes through the volume of the apparatus per unit time.

The ethylene employed for the polymerization should be not less than 98% pure. The n-butyl acrylate is commercially available. The copolymerization of the ethylene with n-butyl acrylate can also be carried out in the presence of other compounds polymerizable with ethylene and n-butyl acrylate to form terpolymers. Suitable copolymerizable compounds, capable of forming terpolymers, are esters of acrylic acid, methacrylic acid, fumaric acid and maleic acid, and vinyl esters of saturated carboxylic acids of 3 to 8 carbon atoms, eg. vinyl acetate.

The ethylene is copolymerized with n-butyl acrylate in the presence of free radical initiators. Examples of suitable initiators are oxygen in amounts of from 10 to 200 mole ppm, based on ethylene, as well as peroxides and other compounds which form free radicals, or mixtures of these. Examples of suitable peroxides are tert.-butyl peroxypivalate, di-tert.-butyl peroxide, tert.-butyl hydroperoxide, tert.-butyl perbenzoate, p-menthane hydroperoxide and dilauroyl peroxide. Free-radical polymerization initiators also include compounds such as azoisobutyronitrile.

The polymerization may be carried out in the presence of conventional polymerization regulators, eg. hydrogen, ketones, alcohols, ethers or hydrocarbons. Examples include propylene, methyl ethyl ketone propionaldehyde. The polymerization regulators are used in amounts of from 0.2 to 5 mole percent, based on ethylene. In general, the polymerization is carried out in the absence of solvents. The small amounts of an inert solvent, eg. benzene, in which the polymerization initiators are dissolved, are negligible in relation to the other starting materials.

After the copolymerization of the ethylene with n-butyl acrylate in the polymerization zone or reaction zone (A), the reaction mixture leaves the reaction zone at a temperature which is generally from 260° to 300° C and passes into a jacketed tube, where it is cooled to from 150° to 250° C, preferably from 200° to 235° (cooling zone B). This process step is carried out whilst letting down the reaction mixture to pressures below 500 atmospheres. The cooled reaction mixture is then passed into a high pressure product isolation zone (C), also referred to as a high pressure separator, where the same pressure prevails as in the interior of the jacketed tube in the upstream cooling zone (B) ie. a pressure of 250 to 500 atmospheres. In this isolation zone, which is also at from 150° to 250° C, preferably from 200° to 235° C, the copolymer formed in the reaction tube is separated from the unpolymerized monomers. The mean residence time, in zones B and C, of the reaction mixture obtained after the polymerization and after cooling to from 150° to 250° C, is from 2 to 10 minutes. The critical factor is that the copolymer formed should be brought as rapidly as possible to below 250° C after leaving the reaction zone (A). For this purpose, the cooling zone (B), consisting of a jacketed tube, is provided between the polymerization zone and the high pressure product isolation zone. It is also essential that in the high pressure product isolation zone (C) all parts of the product which resides in zones B and C for from 2 to 10 minutes should be at a constant temperature of from 150° to 250° C. For this purpose, the high pressure product isolation zone is preferably kept constant to ± 2° C. From the high pressure product isolation zone (C) the copolymer, which still contains small amounts of monomers, is passed into a conventional downstream low pressure product isolation zone (D), also referred to as a low pressure separator, where pressures of from 1 to 10 atmospheres prevail. From there, the copolymer is passed into a discharge extruder (E).

According to an advantageous embodiment of the present invention, the low pressure product isolation zone (D) and the output extruder (E) are directly connected to one another, without an intervening shut-off device, and the level of the reaction mixture in D is set by the output of E. In a particularly advantageous embodiment of the process, the level in D should fluctuate by at most ±3%.

Direct connection of D and E, without an invervening shut-off device, means coupling D and E without an interruption, so that there is no shut-off device of any type which stops or restricts the flow of the reaction mixture from D to E. Accordingly, it is preferred not to use any shut-off device between D and E in order to regulate the level of the reaction product in D; instead, the level is preferably regulated exclusively by the output rate of the extruder E. This output rate is determined by the speed of the screw of the extruder E. The level of the reaction mixture in D, i.e., the height to which D is filled, can thus preferably be regulated by the speed of the screw and be kept constant to ± 3%. As a result of this preferred measure, products of very good homogeneity, and hence giving very good films, can be obtained even if the reactor runs for lengthy periods.

The melt index of ethylene/n-butyl acrylate copolymers manufactured according to the invention, which contain from 99.9 to 70 percent by weight of ethylene and from 0.1 to 30 percent by weight of n-butyl acrylate as copolymerized units, is from 0.1 to 50 g/10 minutes, preferably from 0.5 to 20 g/10 minutes (determined by the method of ASTM-D-1238-65T at 190° C under 2.16 kg).

In the Examples which follow, parts are by weight.

EXAMPLE 1

The reactor described above (reaction zone A) is fed with a mixture, compressed to 2,000 atmospheres, which consists of 10,000 parts of ethylene, 400 parts of n-butyl acrylate and 15 mole ppm, based on ethylene, of oxygen. The heat transfer medium in zones I and II of the reactor jacket is kept at 195° C during the polymerization. As a result of the heat of reaction liberated, the reaction mixture reaches peak temperatures of 280° C. The mean residence time of the reaction mixture in the reactor is 50 seconds.

The polymer is cooled to 250° C under a pressure of 300 atmospheres and is left under a pressure of 280 atmospheres, at 250° C, in the high pressure separator (high pressure product isolation zone C) downstream from the reactor. The temperature in the high pressure separator is kept constant; the maximum deviation is ± 2%. The mean residence time of the ethylene copolymer in the high pressure separator is 10 minutes. The reaction mixture leaving the high pressure product isolation zone (C) is passed via the low pressure product isolation zone (D) into a discharge extruder (E). 1,950 parts of an ethylene copolymer containing 19.8 percent by weight of n-butyl acrylate as copolymerized units, are obtained. The ethylene copolymer has a melt index (190° C/2.16 kg) of 1.95 g/10 minutes and a density (according to DIN 53,479/7.2) of 0.9256 g/cm$^3$, possesses good homogeneity and exhibits good film-forming properties.

EXAMPLE 2

The procedure described in Example 1 is followed, and the reaction mixture leaving the high pressure product isolation zone (C) is passed via a low pressure product isolation zone (D) into a discharge extruder (E), but D and E are directly connected to one another, without any shut-off device, and the level of the reaction mixture in D is set by the output of E and is kept constant to ± 3%. 1,950 parts of an ethylene copolymer which contains 19.8 percent by weight of n-butyl acrylate as copolymerized units, are obtained. The ethylene copolymer has a melt index of 1.95 g/10 minutes and a density of 0.9255 g/cm$^3$, has a good homogeneity even after the reactor has run for lengthy periods and exhibits good film-forming properties.

COMPARATIVE EXAMPLE

A mixture, compressed to 2,200 atmospheres, which consists of 10,000 parts of ethylene, 400 parts of n-butyl acrylate and 15 mole ppm (based on ethylene) of oxygen is fed to the reactor described in Example 1. The temperature of the heat transfer medium in zones I and II of the reactor jacket is 195° C. As a result of the heat of reaction liberated, the reaction mixture reaches a maximum temperature of 280° C in both zones.

Contrary to Examples 1 and 2, the polymer is not cooled, and instead is directly transferred into a high pressure product isolation zone (C), where a temperature of 290° C prevails. The temperature fluctuates by ± 10° C. The reaction mixture is then passed via a low pressure product isolation zone (D) into a discharge extruder (E), D being connected to E by a 5 m long product pipeline, with a shut-off device for regulating the level in D. The homogeneity of the ethylene copolymers obtained deteriorates as the running time of the reactor increases.

|  | Polymer quality | Reactor running time (hours) | | | | | | | | |
|---|---|---|---|---|---|---|---|---|---|---|
|  |  | 100 | 200 | 400 | 600 | 800 | 1,000 | 1,200 | 1,600 | 2,000 |
| Example 1 | Homogeneity | uniformly good | | | | | | | | |
|  | Discoloration | none | | | | | | | | |
|  | Proportion of fisheyes | 0 | 0 | 0 | 0 | 0 | 0 | 0 | isolated | |
|  | Number of specks | | | | | | | | | |
|  | I (0.5–1 mm) | <20 | <20 | <20 | <20 | <20 | <20 | <20 | 25 | 25 |
|  | II (1–2 mm) | <1 | <1 | <1 | <1 | <1 | <1 | <1 | 3 | 4 |
|  | III (>2 mm) | <0.1 | <0.1 | <0.1 | <0.1 | <0.1 | <0.1 | <0.1 | 0.3 | 0.3 |
| Example 2 | Homogeneity | uniformly good | | | | | | | | |
|  | Discoloration | none | | | | | | | | |
|  | Proportion of fisheyes | 0 | 0 | 0 | 0 | 0 | 0 | 0 | 0 | 0 |
|  | Number of specks | | | | | | | | | |
|  | I (0.5–1 mm) | <20 | <20 | <20 | <20 | <20 | <20 | <20 | <20 | <20 |
|  | II (1–2 mm) | <1 | <1 | <1 | <1 | <1 | <1 | <1 | <1 | <1 |
|  | III (>2 mm) | <0.1 | <0.1 | <0.1 | <0.1 | <0.1 | <0.1 | <0.1 | <0.1 | <0.1 |
| Comparative Example | Homogeneity | good | | fairly good | | fair | | | fairly poor | poor |
|  | Discoloration | none | none | none | none | none | none | none | slight | distinct |
|  | Proportion of fisheyes | 0 | 0 | 0 | 0 | isolated | | | isolated but regular | pronounced |
|  | Number of specks | | | | | | | | | |
|  | I (0.5–1 mm) | <20 | <20 | 20–25 | 20–25 | 25 | 25 | 30 | 42 | 50 |
|  | II (1–2 mm) | <1 | <1 | 1–2 | 1–2 | 3–4 | 3–4 | 5 | 10 | |
|  | III (>2 mm) | <0.1 | <0.1 | 0.2 | 0.2 | 0.3 | 0.3 | 0.3 | 0.5 | 2 |

We claim:

1. A process for the manufacture of an ethylene copolymer which contains from 99.9 to 70 percent by weight of ethylene and from 0.1 to 30 percent by weight of n-butyl acrylate as copolymerized units, by copolymerization of ethylene and n-butyl acrylate in a polymerization zone (A) at a pressure above 800 atmospheres and at from 150° to 350° C, with a mean residence time sufficient to cause polymerization but which is at most 100 seconds and temperatures of from 260° to 300° C at the outlet, and immediately passing the reaction mixture obtained after polymerization, via a cooling zone (B), where the temperature of the polymer is rapidly brought to below 250° C, successively into a high pressure product isolation zone (C), a low pressure product isolation zone (D) in which the pressure is from 1 to 10 atmospheres, and a discharge extruder (E), wherein the zones (B) and (C) are at the same pressure of from 250 to 500 atmospheres and at the same constant temperature of from 150° to 250° C, and the mean residence time of the reaction mixture in zones (B) and (C) together is from 2 to 10 minutes.

2. A process as claimed in claim 1, wherein the cooling zone (B) and the high pressure product isolation zone (C) are at from 200° to 235° C.

3. A process as claimed in claim 1, wherein the temperature of the reaction mixture in the high pressure product isolation zone (C) is kept constant to ± 2° C.

4. A process as claimed in claim 1, wherein the low pressure product isolation zone (D) and the discharge extruder (E) are directly connected to one another, without any intervening shut-off device, and the level of the reaction mixture in (D) is determined by the output of (E).

5. A process as claimed in claim 1, wherein the level of the reaction mixture in (D) fluctuates by at most ± 3%.

* * * * *